Patented July 27, 1948

2,446,119

UNITED STATES PATENT OFFICE 2,446,119

GLASS FIBER REINFORCED PLASTICS

Erven White, Robert Steinman, and Lawrence P. Biefeld, Newark, Ohio, assignors to Owens-Corning Fiberglas Corporation, Toledo, Ohio, a corporation of Delaware No Drawing. Application July 27, 1944, Serial No. 546,928

4 Claims. (Cl. 117—124)

This invention relates to mineral fiber reinforced synthetic resins or plastics and more particularly to improving the strength of plastics reinforced with glass fibers.

A limitation in achieving maximum strength in plastics reinforced with glass fibers has been the inability to obtain a degree of adhesion of the plastic to the fiber surfaces that will permit the great strength of the fibers to be fully realized. The relatively poor adhesion previously existing was apparently due to several related factors. One of these is the inability of most conventional synthetic resins and especially those of the thermosetting types, to fully wet a glass surface. As a result of this, voids are believed present in previous composite articles of synthetic resins and glass fibers so that portions of the fibers were unsupported by the resin and the strength of the composite article was decreased by this condition.

Another factor contributing to poor adhesion is that most conventional synthetic resins do not bond securely to glass surfaces so that even if the fibers were completely wetted by the resin, the resin and the fiber surfaces could separate upon the application of relatively low stresses so that the strength of the composite article was relatively low.

Still another factor contributing to poor adhesion between the resin and the glass fibers was the incompatibility of most of the resins with the sizing material that was applied to the fibers immediately after their formation to lubricate the fibers and bind them together into an integral strand. Some of the constituents of the sizing material prevented complete cure of the resin adjacent the fiber surfaces to adversely affect bonding of the resin to the fibers.

Several suggestions have previously been made to improve the adhesion of the resin to the fibers and thus improve the strength of glass fiber reinforced plastics, and while some of these have resulted in some improvement in strength, none of them has achieved increases in strength approaching those theoretically obtainable.

One prior suggestion for improving the adhesion of resins to glass fibers was to apply to the fibers a sizing material that displays good bonding properties to the glass and at the same time is compatible with and adheres well to the resin. The application of these sizings, however, has involved the removal of the sizing material applied during production of the fibers and a further treatment of the fibers to apply the second sizing material. The added cost of this extra treatment of the fibers has not, however, been justified by the degree of increase in strength resulting from this treatment.

It has also been suggested to heat the fibers to relatively high temperature, say in the neighborhood of about 500° C. for a time sufficient to burn off all foreign matter and remove most of the moisture from the fiber surfaces. When this step was employed by itself the problem of obtaining thorough wetting of the glass fiber surfaces by the resin was still present, and the adhesion between the resin and the heat-cleaned fiber was not markedly improved. When this heat cleaning step was employed in connection with a subsequent sizing of the heat cleaned fibers with a material compatible with the resin, the cost was further increased by this added step and the increase in strength achieved was not sufficient to justify always the added expense of the two treatments.

It is an object of the present invention to greatly increase the strength of glass fiber reinforced plastics by greatly increasing the adhesion to glass fibers of the synthetic resins conventionally combined with fibrous materials in the manufacture of fiber-reinforced plastics.

It is a further object to achieve this increase by a simple treatment of the fibers after they are processed into strands, yarns or cloth without the need for application of any sizing materials other than those normally used during the production of the fibers to lubricate the fibers and bind them together.

The invention is applicable alike to cloth of inter-woven glass fibers, to loose masses or webs or mats of glass fibers, glass fibers in the form of flock, short lengths of yarns, warps of yarns, or sheets of interbonded parallel glass fibers.

The most effective binding and lubricating material employed at the present time for sizing textile glass fibers during their production is a mixture of a binding agent such as starch, dextrinized starch and the like with an aqueous emulsion of a lubricant such as mineral, animal or vegetable oil. As an example, this sizing composition may contain from about 3 to 15% starch or dextrinized starch, about 1 to 5% oil, .1 to 1% cationic-active substance such as cetyl or stearyl monoamine hydrochloride or acetate, and about 4% of various additives such as plasticizers, emulsifying agents, wetting agents and other materials, in sufficient water to make up 100%. Part of the starch may be replaced with gelatin and in the latter case the composition may also contain small amounts of plasticizers and insolbilizing agents for the gelatin in addition to the other materials. Also a small amount of resin such as polyvinyl alcohol may replace part of the starch. Other cationic-active substances that may be employed are dodecyl amine, hexadecyl amine, and the corresponding secondary or tertiary derivatives of the same, for instance, dodecyl methyl amine, and the salts thereof. The quaternary ammonium compounds such as trimethyl stearyl or cetyl ammonium bromide, and, generally, any of the amine compounds that dissociate in water systems to provide a positive radical containing a group of more than eight and preferably twelve or more carbon atoms, may be used.

This sizing composition is sprayed or wiped onto the fibers immediately after their formation and acts to lubricate the fiber surfaces and thus overcome the strong tendency of the fibers to seize and abrade each other, and it also binds the fibers together into a strand of sufficient integrity to permit the further operations of twisting, plying, weaving, and so forth. The amount of sizing material applied to the fibers is usually about 1 to 3% by weight of the fibers.

While these sizing compositions have been found most advantageous in the fabrication of the fibers and of the yarns and cloth therefrom, they materially detract from the strength of glass fiber plastic products. One or more of the constituents have been found to be incompatible with most of the resins applied to yarns or fabrics made from fibers sized with three compositions. Some of the constituents, for example the oil, have also been found to have a deleterious effect on the cure of most of the resins and in such case good adhesion was prevented by the incompletely cured resin adjacent the fiber surfaces.

We have discovered that not only can the adverse effects of these sizing compositions be removed but in addition the sizing compositions can, by a simple heat treatment, be converted to a coating on the fiber surfaces that improves the wetting of the surfaces by the resins, forms an intermediate bonding agent that adheres with great tenacity to the fibers and that bonds well to the resin. Since the heat treatment specified removes the oil as such and converts the starch to a substantially inert condition there is little or no tendency for the materials remaining on the fiber surfaces to combine with or otherwise adversely affect the resins subsequently applied to the coated fibers.

In the practice of this invention the fibers are made in the conventional manner and sized during fabrication with the usual sizing compositions. In the ordinary manner the fibers are processed into the form desired as plastic reinforcement, as into yarns and cloth, without removal of the size. The yarns, cloth, or fibers in other form are then heated to a relatively low temperature, preferably immediately before being combined with the selected resin and the reinforced plastic articles are then produced from the fiber and plastic mixtures following any desired procedure.

The heat treatment is most effectively carried out at temperatures of approximately 200° C. for about ½ to 3 hours depending upon the degree of adhesion desired in the finished article, the greater length of time providing the greater degree of adhesion.

At this temperature the vegetable oil ordinarily employed in the sizing composition is decomposed and volatilized so that after about ½ hour at 200° C. no extractable oil remains on the fiber surfaces. Other oils, such as light mineral oils, that may be used in the sizing composition on the fibers may require heat treatment for longer periods, say up to 3 hours, to completely remove the oil. Complete removal of all oil as such is a highly effective factor in improving the adhesion of the resins to the glass fibers. While at the specified temperatures and times some residue on the fibers may result from volatilization of the oil, this is apparently a tarry or pitch-like substance that has no deleterious effect on adhesion of resins to the fiber surfaces.

At this temperature of 200° C. the starch or dextrinized starch begins to caramelize and this caramelization proceeds during the heat treating period to a maximum that is reached after about 3 hours of heating. Treatments in excess of this time ordinarily do not show appreciable improvement in adhesion of resin to the heat treated fibers.

Dextrinized starch, that is, the commercially available product or starch that has been partially dextrinized, is preferable to plain starch since it is more readily converted to an adherent coating on the fibers. In addition to starch or dextrinized starch, and in place of polyvinyl alcohol, other polyhydroxy material of the corbohydrate type may be used, for instance, cellulose derivatives, but starch and dextrinized starch have been found best suited as sizing materials in the fabrication of the fibers and in the production of yarns and cloth therefrom.

In certain cases where part of the starch is replaced with gelatin, the gelatin has been found apparently amenable to heat treatment at the same temperatures and for the same length of time as the starch, although the effect of the heat treatment on the gelatin must obviously be somewhat different from the effect of heating on the starch. It is believed that the gelatin is insolubilized by the heating but no other substantial change in the gelatin occurs except that the removal of moisture by the heating increases the adhesion of the gelatin to the fiber surfaces. However, in the cases of both starch, and of gelatin and polyvinyl alcohol where used, the heating apparently has a pronounced effect in fixing the materials to the surfaces of the glass fibers. Tests have demonstrated that after heat treatment of fibers coated with sizing containing dextrinized starch, boiling of the fibers in water for 3 hours, a severe test in view of the great affinity of glass for water, removes less than 50% of the starch.

The fixing of the starch to the fiber surfaces is also aided, it seems, by the removal of moisture from the surfaces at the heat treating temperature. The absence of moisture on the fibers may be taken advantage of in a further way by heat treating the fibers immediately prior to the application of resin to the fibers. In this way absorption of moisture from the atmosphere by the surfaces of the fibers is prevented.

There is a further effect of the heat treatment of the sizing composition in the manner specified. The heating converts the cationic-active substance in the composition to a material having a pronounced effect in increasing adhesion of synthetic resins to the fiber surfaces. This is evidenced by tests wherein glass fiber fabrics from which all organic matter was removed were coated with the cationic-active substances in amounts corresponding to the proportions of such substances in the sizing composition. The fabrics were then heat treated at the same temperatures and for the same times as the regularly sized fibers and incorporated with allyl type resins into plastic laminates. These laminates when tested for edgewise compressive strength demonstrated that the heat treated cationic-active substances alone accounted for a substantial increase in strength.

The heat treated cationic-active substances apparently act to aid the cure of the resin applied to the fabrics. Heat treatment at the specified temperatures oxidizes the cationic-active substances, converting them to peroxides which have a catalytic effect on allyl type resins and other resins catalyzed by peroxides. The resulting improved cure of the portion of the resin adjacent the fiber surfaces provides a more secure bond of the resin to the glass with a consequent increase in strength of the glass fiber reinforced resin body. The substantial improvement obtained from the use of heat treated cationic-active materials makes it practicable to use a sizing of these materials alone when an adhesion-promoting coating is desired for application to uncoated glass fibers or fibers from which the original coating has had to be removed. Ordinarily only a few hundredths of one percent, for example .01 to .01%, of the cationic-active substance by weight of the glass fibers is needed to achieve the desired improvement in strength of glass fiber reinforced plastics.

The heating period may be decreased by increasing the treating temperature. It has been found that temperatures substantially above 200° C. may be employed if the time is correspondingly decreased. For example, temperatures up to about 400° C. can be applied to the fibers by passing glass fiber fabrics over rolls heated to these temperatures, the fabrics being in contact with the surfaces of the rolls for very short periods ranging down to two or three seconds. The proper time of treatment at any given temperature can be readily gauged by testing for the quantity of starch product remaining on the fiber surfaces after boiling the treated fibers in water for 3 hours or some shorter period as desired, the aim, of course, being to obtain fixed to the fiber surfaces a large part, say 50%, of the original amount of starch on the fibers.

The temperatures and times of treatment must be selected to avoid overheating of the sizing composition. For example, heat treatment at temperatures much in excess of 200° C. for 3 hours offsets in other respects the advantages obtained from the heat treatment. Thus, treatment at about 300° C. for several hours causes a decomposition of the gelatin so that any bonding effect that would be normally achieved by the fixing of the gelatin to the fiber surfaces is lost. A similar loss of the bonding effect normally due to the heat treated starch is apparent if the heating is carried much above 200° C. for 3 hours. In fact, heating at 225° C. for 3 hours causes a loss of almost 75% of the starch originally present on the fiber surfaces and a proportional loss of bonding effect.

More serious perhaps is the effect of temperatures above 200° C. upon the strength of the fabrics as shown by tests made on cloths and yarns of glass fibers sized with the specified sizing composition. Up to about 200° C., heat treatments averaging over periods of time from ¼ hour to 8 hours not only do not decrease the tensile strength of the sized fibrous glass cloths but in fact cause a slight increase of 5 or 10% in the strength. Temperatures in excess of this, however, cause a decrease in the breaking strength below the maximum resulting from treatment at 200° C. At treatments in the neighborhood of 225° C. the breaking strength of the cloth begins to rapidly decrease below the original breaking strength. Of course, any heat treatment in excess of 225° C. for 3 hours may defeat the result sought since any increase in adhesion of the resin would be offset by a decrease in the strength of the fabrics themselves.

Tests made on plastic laminates of various types of resins embodying glass fiber cloth treated in accordance with the present invention have shown that edgewise compressive strengths, which are clearly indicative of the degree of resin-to-glass adhesion, are increased from 50% to above 200% over the strength achieved with glass fiber cloths not so treated. Tensile strengths also show an increase but since tensile strengths have always been in excess relative to edgewise compressive strengths, this phenomenal increase in compressive strengths best demonstrates the importance of the present treatment.

Heat treating may be carried out in any suitable manner, as by passing the fibers in the form of loose masses, mats, cloth or yarns through an oven or over or between heated rolls at speeds that will expose the sizing to the required temperature for the proper period of time. In the case of continuous lengths of fibrous material such as sheets, cloth or yarns, the heat treatment may be a continuous operation and may be in conjunction with the resin application step, the sheets, cloth or yarn moving directly from the oven or rolls into a solution of resin or to other resin applying station. However the application of the resin is effected, conventional practice may be followed in superposing a number of pieces of resin-impregnated cloth or in collecting a quantity of resin coated fibers in other fabricated form and curing the resin under heat or pressure or both to produce fiber reinforced plastic bodies, or in any other way combining the heat treated fibrous glass with resin in the manufacture of fiber reinforced plastics.

Various modifications may be made within the spirit of the invention and the scope of the claims.

We claim:

1. As an article of manufacture, a body of synthetic resin containing distributed therein a plurality of glass fibers as reinforcement, the fiber surfaces being provided with an adherent coating of heat treated dextrinized starch, the heat treated starch being incapable of entire removal by boiling the fibers in water for three hours, the adherent film of heat treated starch providing an intermediate layer between the fibers and the resin.

2. The process of treating glass fibers to increase the adhesion between the fibers and coating materials such as synthetic resins which comprises coating the fibers with a material containing dextrinized starch, heating the coated fibers to a temperature of from approximately 200° C. for one-half to three hours to about 400° C. for two to three seconds to fix the starch securely to the fiber surfaces and subsequently coating the fibers with synthetic resin.

3. The process of treating glass fibers to increase the adhesion between the fibers and coating materials such as resins which comprises coating the fibers with a material containing starch, and heating the coated fibers to a temperature of approximately 200° C. for a time sufficient to fix the starch to the fiber surfaces to the extent where it is not entirely removed by boiling the fibers in water for three hours, and subsequently coating the fibers with synthetic resin.

4. The process of treating glass fibers coated with a material containing dextrinized starch and oil, which comprises heating the coated fibers to a temperature of approximately 200° C. for one-half to three hours to remove all extractable oil from the fiber surfaces and to convert the starch to a relatively water-insoluble substance securely fixed to the fiber surfaces and subsequently coating the fibers with synthetic resin.

ERVEN WHITE.
ROBERT STEINMAN.
L. P. BIEFELD.

REFERENCES CITED

The following references are of record in the file of this patent:

UNITED STATES PATENTS

| Number | Name | Date |
| --- | --- | --- |
| 741,592 | Roberts | Oct. 13, 1903 |
| 1,981,292 | Todd et al. | Nov. 20, 1934 |
| 2,138,882 | Robie | Dec. 6, 1938 |
| 2,234,986 | Slayter | Mar. 18, 1941 |
| 2,341,219 | Jones | Feb. 8, 1944 |
| 2,370,046 | Keyes | Feb. 20, 1945 |